United States Patent [19]

Hayakawa

[11] Patent Number: 5,585,621
[45] Date of Patent: Dec. 17, 1996

[54] METHOD OF DRIVING SOLID-STATE IMAGE PICKUP APPARATUS

[75] Inventor: Yoshihiro Hayakawa, Tokyo, Japan

[73] Assignee: Kabushiki Kaisha Toshiba, Kawasaki, Japan

[21] Appl. No.: 535,332

[22] Filed: Sep. 28, 1995

[30] Foreign Application Priority Data

Sep. 29, 1994 [JP] Japan .................................. 6-234833

[51] Int. Cl.$^6$ .................................................. H01J 40/14
[52] U.S. Cl. ...................................... 250/208.1; 348/319
[58] Field of Search ............................ 250/208.1, 208.6, 250/578; 348/311–319, 303, 304, 322, 282, 283; 257/229–232; 377/60, 62

[56] References Cited

U.S. PATENT DOCUMENTS

| | | | |
|---|---|---|---|
| 5,194,724 | 3/1993 | Sekine | 250/208.1 |
| 5,434,437 | 7/1995 | Itakura et al. | 250/208.1 |

FOREIGN PATENT DOCUMENTS

| | | |
|---|---|---|
| 0553869 | 8/1993 | European Pat. Off. . |
| 0587179 | 3/1994 | European Pat. Off. . |

*Primary Examiner*—Que T. Le
*Attorney, Agent, or Firm*—Oblon, Spivak, McClelland, Maier & Neustadt, P.C.

[57] ABSTRACT

A method of driving a solid-state image pickup apparatus suppresses a shading in the dark output of the apparatus. The apparatus has a line of photosensors to produce signal charges in response to the intensity of incident light, and parallel lines of analog shift registers to successively transfer the signal charges from the photosensors. When the charges are transferred from an inner one of the shift register lines to an outer one thereof, dark charges in the inner shift register line are kept as they are.

6 Claims, 9 Drawing Sheets

METHOD OF DRIVING SOLID-STATE IMAGE PICKUP APPARATUS

BACKGROUND OF THE INVENTION

1. Field of the Invention

The present invention relates to a method of driving a solid-state image pickup apparatus that transfers charges between registers.

2. Description of the Prior Art

FIG. 1 shows a solid-state image pickup apparatus that transfers charges between registers according to the prior art.

This apparatus has a line of photosensors 101. The photosensors 101 are arranged in a main scanning direction and generate signal charges in response to the intensity of incident light. Shift gates 111 and 112 are alternately arranged along the photosensors 101. The shift gates 111 control the integration period of odd ones of the photosensors 101, and the shift gates 112 control the integration period of even ones of the photosensors 101.

Inner and outer analog shift registers 121 and 122 are arranged in parallel with the shift gates 111 and 112. The inner register 121 has transfer electrodes ø 1 adjacent to the shift gates 111 and transfer electrodes ø 2 adjacent to the shift gates 112. Similarly, the outer register 122 has transfer electrodes ø 1 and ø 2 that are alternated. The electrodes ø 1 of the inner and outer registers 121 and 122 receive a drive pulse, and the electrodes ø 2 thereof receive another drive pulse. Namely, they are driven in two phases.

Transfer gates 131 are arranged between the electrodes ø 1 of the inner and outer registers 121 and 122, for controlling the transfer of charges between the registers 121 and 122. An output circuit 141 converts charges transferred by the inner register 121 into a voltage, and an output circuit 142 converts charges transferred by the outer register 122 into a voltage.

A method of driving the apparatus of FIG. 1 will be explained with reference to a timing chart of FIG. 2.

An electrode SH1 of each shift gate 111 and each electrode ø 1 are opened, i.e., set to HIGH at time t1 to transfer signal charges from the odd photosensors 101 to the electrodes ø 1 of the inner register 121. At this time, dark charges in the electrodes ø i are mixed with the signal charges. Since the electrodes ø 2 are set to LOW, dark charges In the electrodes ø 2 are transferred to the electrodes ø 1, and these are mixed with each other.

An electrode TG of each transfer gate 131 is opened at time t2, to transfer the signal charges mixed with the dark charges of the electrodes ø 1 and ø 2 are transferred from the inner register 121 to the electrodes ø 1 of the outer register 122 at time t3. After all charges of the inner register 121 are transferred to the outer register 122, an electrode SH2 of each shift gate 112 is opened at time t4, to transfer signal charges from the even photosensors 101 to the electrodes ø 2 of the inner register 121.

After time t5, charges are transferred from the electrodes ø 2 to ø 1 when the electrodes ø 1 are HIGH and the electrodes ø 2 are LOW. When the electrodes ø 1 are LOW and the electrodes ø 2 are HIGH, charges are transferred from the electrodes ø 1 to the electrodes ø 2. Thereafter, the charges are successively transferred to the output circuits 141 and 142.

The problems of the prior art will be explained with reference to FIG. 3, in which (a) shows a waveform of the dark output of the inner register 121 provided through the output circuit 141, and (b) shows a waveform of the dark output of the outer register 122 provided through the output circuit 142. Each waveform includes a register-to-register transfer period K1, an output period K2 of the photosensors 101, and a transfer margin period K3.

The waveform (a) is zero in the period K1 (corresponding to a period between t2 and t3 of FIG. 2) because all dark charges of the inner register 121 are transferred to the outer register 122 in this period. The number of electrodes ø 1 and ø 2 that are present between one of the photosensors 101 and the output circuit 141 is different from photosensor to photosensor. Accordingly, dark charges in the electrodes ø 1 and ø 2 are accumulated to cause a shading, i.e., an inclination to the right in the dark output (a). A total of the accumulated dark charges of the inner register 121 is P1.

Referring to the dark output (b) of the outer register 122, dark charges in the inner register 121 are added to dark charges in the outer register 122 in the period K1 (corresponding to a period between t2 and t3 of FIG. 2). If the dark charges in the inner register 121 are not added, the dark charges in the outer register 122 will be steady. Since the dark charges transferred from the Inner register 121 to the outer register 122 have a shading to the left, the dark output (b) of the outer register 122 has a shading to the left. The dark charges in the outer register 122 are represented with P2.

FIG. 4 shows a waveform (a) of the bright output of the inner register 121 provided through the output circuit 141, and a waveform (b) of the bright output of the outer register 122 provided through the output circuit 142. These waveforms are formed by adding given output signals to the waveforms (a) and (b) of FIG. 3.

In FIG. 4, a reference mark P11 represents the output of the inner register 121 due to light, and P12 and P13 represent dark charges in the inner register 121. A reference mark P14 represents dark charges in the outer register 122, P15 represents the output of the outer register 122 due to light, and P16 represents dark charges transferred from the inner register 121.

As is apparent in FIG. 4, a bright output waveform is formed by adding a given output signal to a dark output waveform. Namely, the bright output waveform includes a shading that causes uneven brightness in an image.

SUMMARY OF THE INVENTION

An object of the present invention is to provide a method of driving a solid-state image pickup apparatus, capable of suppressing a shading in a dark output.

Another object of the present invention is to provide a method of driving a solid-state image pickup apparatus, capable of suppressing a shading in a dark output and shortening a register-to-register transfer period.

Still another object of the present invention is to provide a method of driving a solid-state image pickup apparatus, capable of suppressing a shading in a dark output and minimizing a difference in integration start time between odd and even pixel lines due to a register-to-register transfer operation.

In order to accomplish the objects, a method of the present invention is applied to a solid-state image pickup apparatus having a line of photosensors for generating signal charges in response to the intensity of incident light, first horizontal transfer registers arranged side by side to face the photosensors with shift gates interposing between them, second horizontal transfer registers corresponding to the first registers, respectively, with transfer gates interposing between them, and output circuits for receiving signal charges horizontally transferred through the first and second registers and providing them outside. The method includes the steps of providing the first registers with a signal to transfer dark charges from even ones of the first registers to odd ones thereof; providing even ones of the shift gates with a signal to transfer signal charges from even ones of the photosensors to the even first registers; providing the transfer gates with a signal to transfer the signal charges transferred to the even first registers to even ones of the second registers; providing odd ones of the shift gates with a signal to transfer signal charges from odd ones of the photosensors to the odd first registers; providing the first and second registers with a signal to horizontally transfer the signal charges transferred to the first and second registers; and successively providing the signal charges horizontally transferred through the first and second registers outside from the output circuits.

The present invention may simultaneously provide the even shift gates with the signal to transfer signal charges from the even photosensors to the even first registers, and the transfer gates with the signal to transfer the signal charges transferred to the even first registers to the even second registers.

When providing the transfer gates with the signal to transfer the signal charges transferred to the even first registers to the even second registers, the present invention may provide the even and odd first registers with a signal opposite to the signal applied to the transfer gates.

The present invention may provide the even and odd first registers with opposite-phase signals, respectively, to horizontally transfer the signal charges, and the even and odd second registers with opposite-phase signals, respectively, to horizontally transfer the signal charges.

A method of another aspect of the present invention is applied to a solid-state image pickup apparatus having a line of photosensors for generating signal charges in response to the intensity of incident light, first horizontal transfer registers arranged side by side to face the photosensors with shift gates interposing between them, second horizontal transfer registers corresponding to the first registers, respectively, with transfer gates interposing between them, and output circuits for receiving signal charges horizontally transferred through the first and second registers and providing them outside. The method includes the steps of providing the first registers with a signal to transfer dark charges from ones of the first registers corresponding to even ones of the photosensors to adjacent ones of the first registers; providing the shift gates with a signal to transfer signal charges from the even photosensors to the first registers; providing the transfer gates with a signal to transfer the signal charges transferred from the even photosensors to the first registers to the second registers; providing the shift gates with a signal to transfer signal charges from odd ones of the photosensors to the first registers; providing the first and second registers with a signal to horizontally transfer the signal charges transferred to the first and second registers; and successively providing the signal charges horizontally transferred through the first and second registers outside from the output circuits.

Still another method of the present invention is applied to a solid-state image pickup apparatus having an array of photosensors for generating signal charges in response to the intensity of incident light, vertical transfer registers arranged adjacent to the columns of the photosensor array, respectively, first horizontal transfer registers arranged side by side adjacent to one ends of the vertical transfer registers with shift gates interposing between them, second horizontal transfer registers corresponding to the first registers, respectively, with transfer gates interposing between them, and output circuits for receiving signal charges horizontally transferred through the first and second horizontal registers and providing them outside. The method includes the steps of providing the first horizontal registers with a signal to transfer dark charges from even ones of the first horizontal registers to odd ones thereof; providing even ones of the shift gates with a signal to transfer signal charges from even ones of the vertical registers to the even first horizontal registers; providing the transfer gates with a signal to transfer the signal charges transferred to the even first horizontal registers to even ones of the second horizontal registers; providing odd ones of the shift gates with a signal to transfer signal charges from odd ones of the vertical registers to the odd first horizontal registers; providing the first and second horizontal registers with a signal to horizontally transfer the signal charges transferred to the first and second horizontal registers; and successively providing the signal charges horizontally transferred through the first and second horizontal registers outside from the output circuits.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF THE EMBODIMENTS

Figure 5:
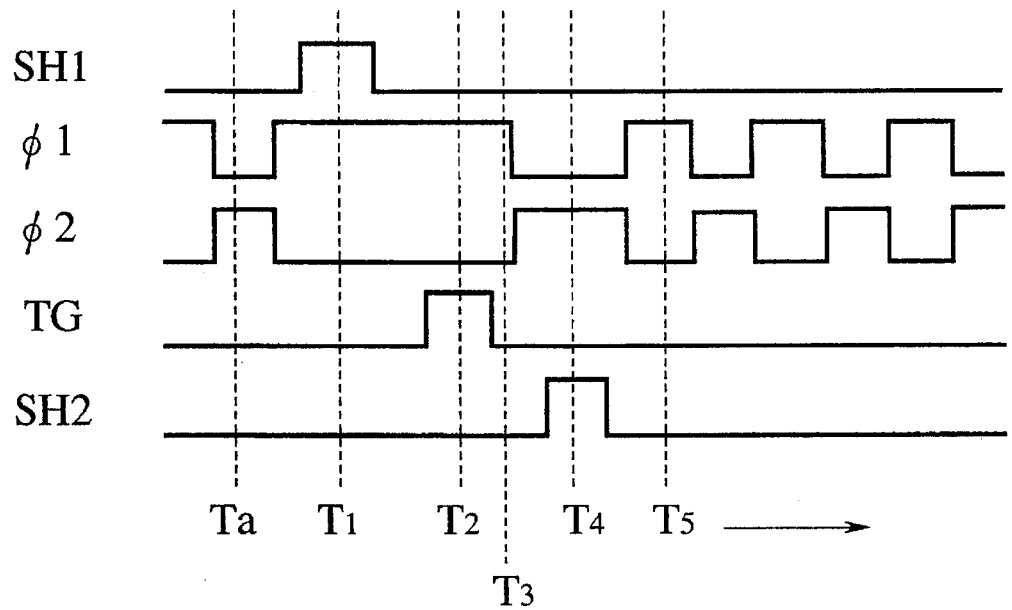
FIG. 5 is a timing chart showing a method of driving a solid-state image pickup apparatus according to a first embodiment of the present Invention.
Figure 6:
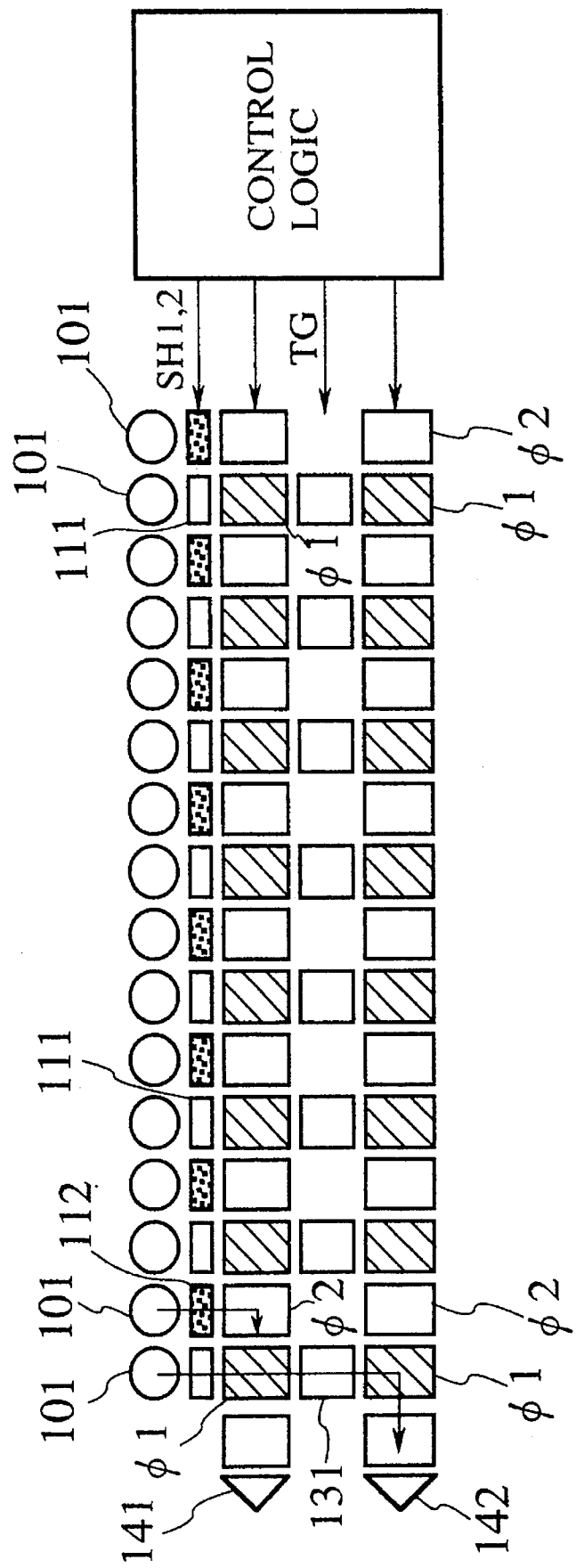
FIG. 6 shows the image pickup apparatus driven according to the first embodiment.

FIG. 5 is a timing chart showing a method of driving a solid-state image pickup apparatus according to the first embodiment of the present invention, and FIG. 6 shows the structure of the apparatus. This apparatus is a line sensor used for a digital copier.

Figure 1:
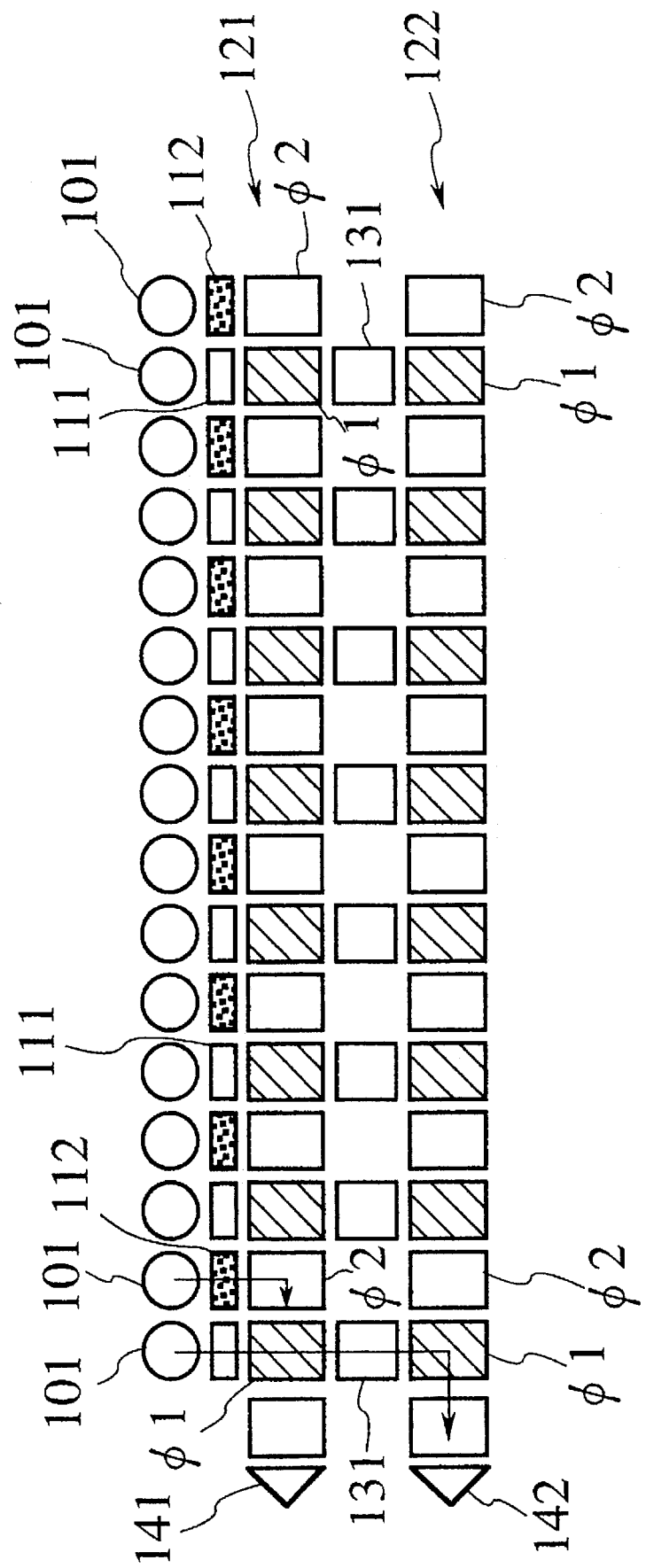
FIG. 1 shows a solid-state image pickup apparatus driven according to a prior art.

The structure of the line sensor is substantially the same as that of the prior art of FIG. 1. Like parts are represented with like reference marks in FIG. 1 and 6.

The line sensor of FIG. 6 has a line of photosensors 101. The photosensors 101 are arranged in a main scanning direction and generate signal charges in response to the intensity of incident light. Shift gates ill and 112 are alternately arranged along the photosensors 101. The shift gates 111 control the integration period of odd ones of the photosensors 101, and the shift gates 112 control the integration period of even ones of the photosensors 101.

Inner and outer analog shift registers 121 and 122 are arranged along the shift gates 111 and 112. The inner register 121 has transfer electrodes ø 1 adjacent to the shift gates 111 and transfer gates ø 2 adjacent to the shift gates 112. Similarly, the outer register 122 has transfer electrodes ø 1 and ø 2. The electrodes ø 1 of the inner and outer registers 121 and 122 receive a drive pulse, and the electrodes ø 2 thereof receive another drive pulse. Namely, they are driven in two phases.

Transfer gates 131 are arranged between the electrodes ø 1 of the inner register 121 and the electrodes ø 1 of the outer register 122, for controlling the transfer of charges between the registers 121 and 122. An output circuit 141 converts charges transferred by the inner register 121 into a voltage, and an output circuit 142 converts charges transferred by the outer register 122 into a voltage.

A control circuit 10 provides these elements with control signals at proper timing. The control signals and the driving method of the present invention will be explained with reference to FIG. 5.

Figure 2:
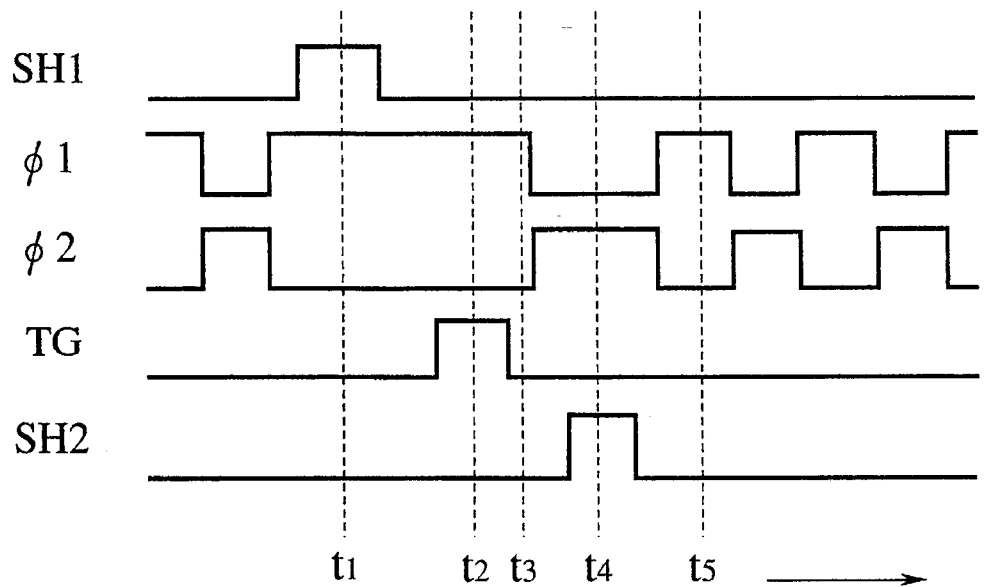
FIG. 2 is a timing chart showing the prior art for driving the apparatus of FIG. 1.
Figure 3:
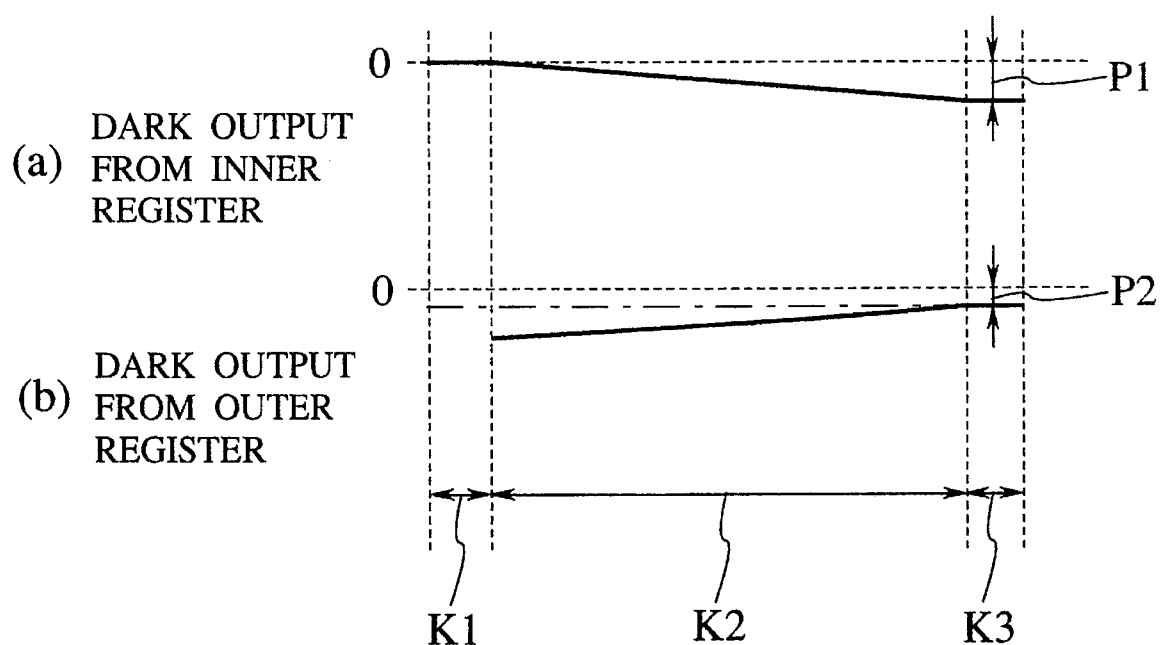
FIG. 3 shows waveforms of dark outputs according to the prior art.
Figure 4:
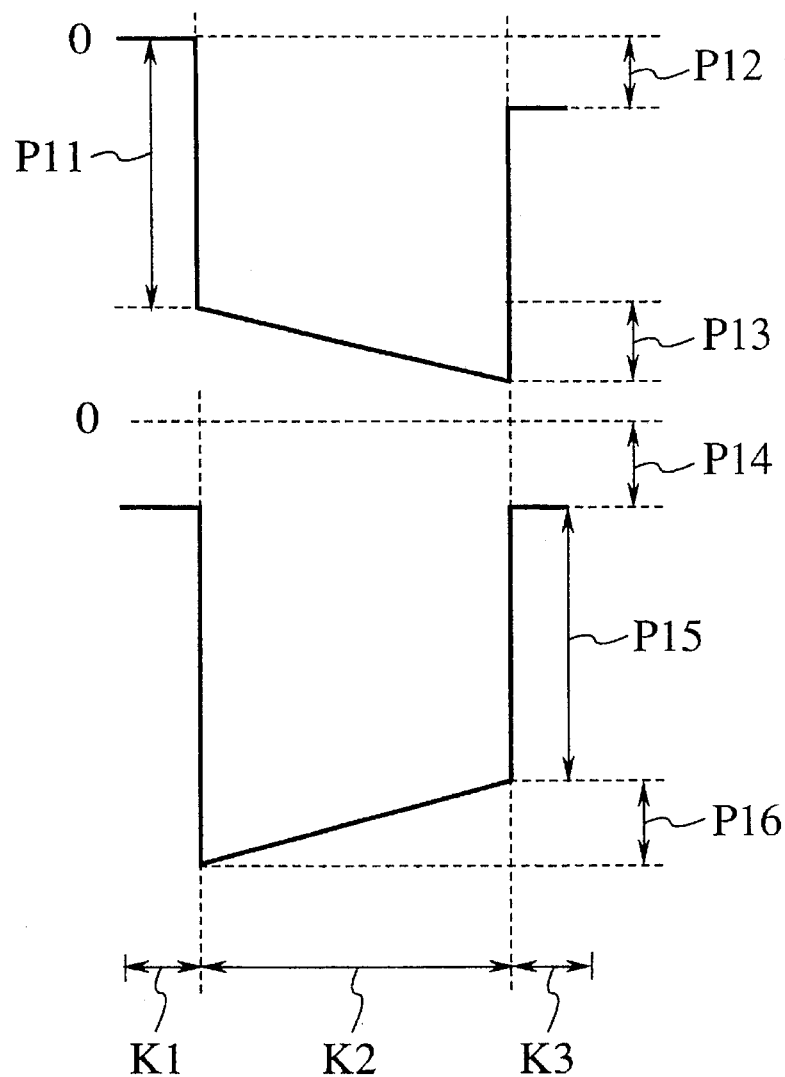
FIG. 4 shows waveforms of bright outputs according to the prior art.

What is different from the prior art of FIG. 2 is that the present Invention transfers all dark charges to the electrodes ø 2 at time Ta before an electrode SH1 of each shift gate 111 and the electrodes ø 1 are opened at time T1, and applies the same voltage to the electrodes ø 1 and ø 2 up to time T3 when a register-to-register transfer operation ends, so that no dark charges may enter the electrodesø1.

More precisely, a signal of LOW is applied to the electrodes ø 1 and a signal of HIGH to the electrodes ø 2 at time Ta, to transfer all dark charges from the electrodes ø 1 to the electrodes ø 2. At time T1, the electrode SH1 of each shift gate 111 and the electrodes ø 1 are set to HIGH, to transfer signal charges from odd ones of the photosensors 101 to the electrodes ø 1. At this time, the electrodes ø 2 are kept at HIGH to transfer no charges from the electrodes ø 2 to the electrodes ø 1. Accordingly, the signal charges are transferred to the electrodes ø 1 from which dark charges have been removed in advance.

According to the prior art, the dark charges in the electrodes ø 1 are mixed with the signal charges, and in addition, dark charges in the electrodes ø 2 are transferred to the electrodes ø 1. According to the present invention, the electrodes ø 1 have no dark charges, and no dark charges are transferred from the electrodes ø 2 to the electrodes ø 1 because the electrodes ø 2 are kept at HIGH like the electrodes ø 1.

At time T2, an electrode TG of each transfer gate 131 is set to HIGH, to transfer the signal charges from the electrodes ø 1 of the inner register 121 to the electrodes ø 1 of the outer register 122 through the transfer gates 131. This is the register-to-register transfer. Until time T3 where the register-to-register transfer ends, the electrodes ø 2 are kept at HIGH like the electrodes ø 1. As a result, only the signal charges of the odd photosensors are transferred to the outer register 122 by the register-to-register transfer. These signal charges are mixed with dark charges present in the outer register 122, to provide a constant output irrespective of the positions of the electrodes in the outer register 122.

After time T4, an electrode SH2 of each shift gate 112 is set to HIGH to transfer signal charges from even ones of the photosensors 101 to the electrodes ø 2 of the inner register 121. After time T5, the inner and outer registers 121 and 122 successively transfer the charges to the output circuits 141 and 142, respectively. When the inner register 121 transfers the charges, the charges are mixed with dark charges present In the inner register 121, to provide a constant output irrespective of the positions of the electrodes in the inner register 121.

Figure 7:
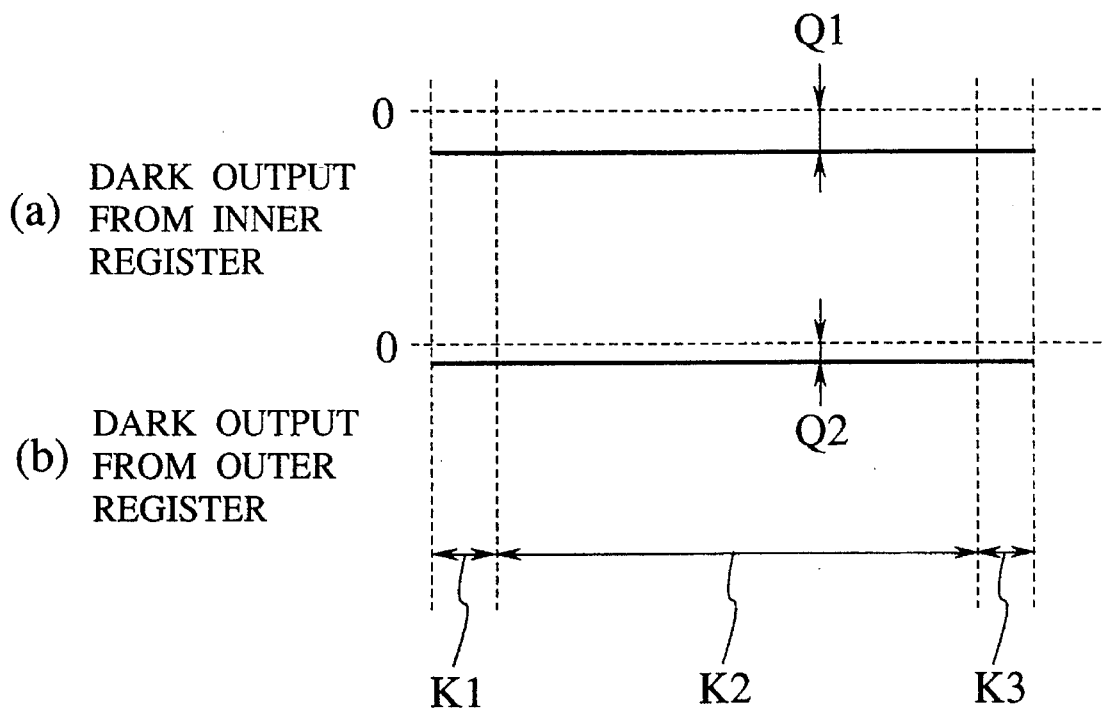
FIG. 7 shows waveforms of dark outputs according to the first embodiment.

FIG. 7 shows a waveform (a) of the dark output of the inner register 121 provided through the output circuit 141, and a waveform (b) of the dark output of the outer register 122 provided through the output circuit 142. Each waveform includes a register-to-register transfer period K1, an output operation period K2 of the photosensors 101, and a transfer margin period K3.

As is apparent in the figure, the dark charges Q1 of the inner register 121 and the dark charges Q2 of the outer register 122 are constant to cause no shading in the dark outputs.

As mentioned above, the present invention transfers all dark charges from the electrodes ø 1 to the electrodes ø 2 before signal charges are transferred from the odd photosensors to the electrodes ø 1. Until time T3 when the register-to-register transfer ends, the present invention applies the same voltage to the electrodes ø 1 and ø 2 so that no dark charges enter the electrodes ø 1 from the electrodes ø 2. Accordingly, the signal charges are transferred only from the odd photosensors to the outer register 122 during the register-to-register transfer. This prevents a shading in the dark output without changing the structure of the apparatus.

Figure 8:
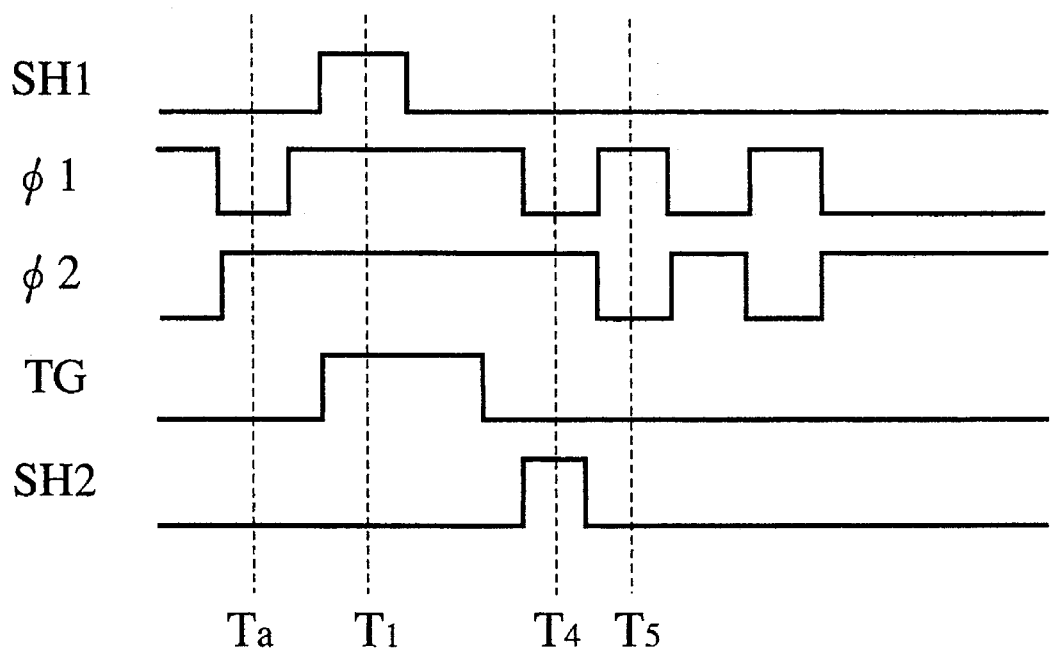
FIG. 8 is a timing chart showing a method of driving a solid-state image pickup apparatus according to a second embodiment of the present invention.

FIG. 8 is a timing chart showing a method of driving a line sensor according to the second embodiment of the present invention.

The line sensor driven by the second embodiment is the same as that of FIG. 6.

What is different from the first embodiment is that the second embodiment opens the electrode TG of each transfer gate 131 at time T1 when the electrode SH1 of each shift gate 111 and the electrodes ø 1 are opened.

The first embodiment first transfers signal charges from the odd photosensors to the electrodes ø 1 of the inner register 121 at time T1, and thereafter, transfers the charges to the transfer gates 131 at time T2. On the other hand, the second embodiment quickly transfers the signal charges from the odd photosensors to the transfer gates 131 through the electrodes ø 1 of the inner register 121 at time T1.

This results in shortening the register-to-register transfer period K1. The other timing of the second embodiment is the same as that of the first embodiment. Accordingly, the dark outputs of the second embodiment are the same as those of the first embodiment of FIG. 7. The second embodiment, therefore, is capable of preventing a shading in the dark outputs without changing the structure of the apparatus.

Figure 9:
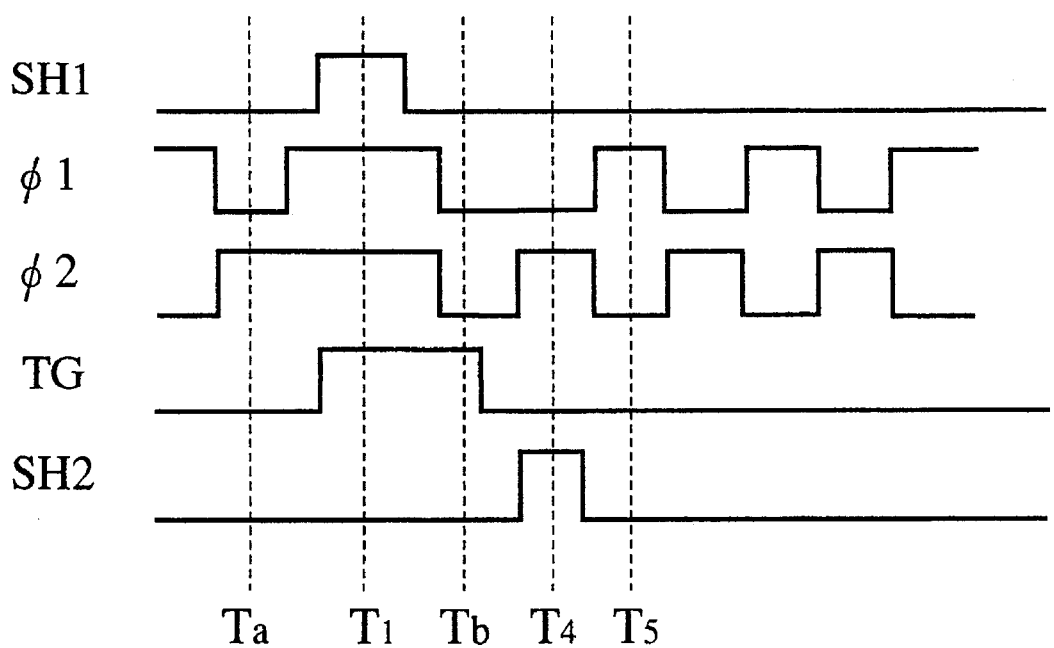
FIG. 9 is a timing chart showing a method of driving a solid-state image pickup apparatus according to a third embodiment of the present invention.

FIG. 9 is a timing chart showing a method of driving a line sensor according to the third embodiment of the present invention.

The method of the third embodiment is applied to the line sensor of FIG. 6.

Similar to the second embodiment, the third embodiment quickly transfers signal charges from the odd photosensors to the transfer gates 131 through the electrodes ø 1 of the inner register 121 at time T1. The third embodiment changes the electrodes ø 1 to LOW at time Tb when the electrodes TG are open. This results in increasing a transfer voltage margin from the electrodes ø 1 to the transfer gates 131. At the same time, the third embodiment sets the electrodes ø 2 to LOW to prevent charges from moving from the electrodes ø 1 to the electrodes ø 2.

The other timing of the third embodiment is the same as that of the second embodiment. Accordingly, the dark outputs of the third embodiment are the same as those of FIG. 7. The third embodiment, therefore, is capable of preventing a shading in the dark outputs without changing the structure of the apparatus.

Figure 10:
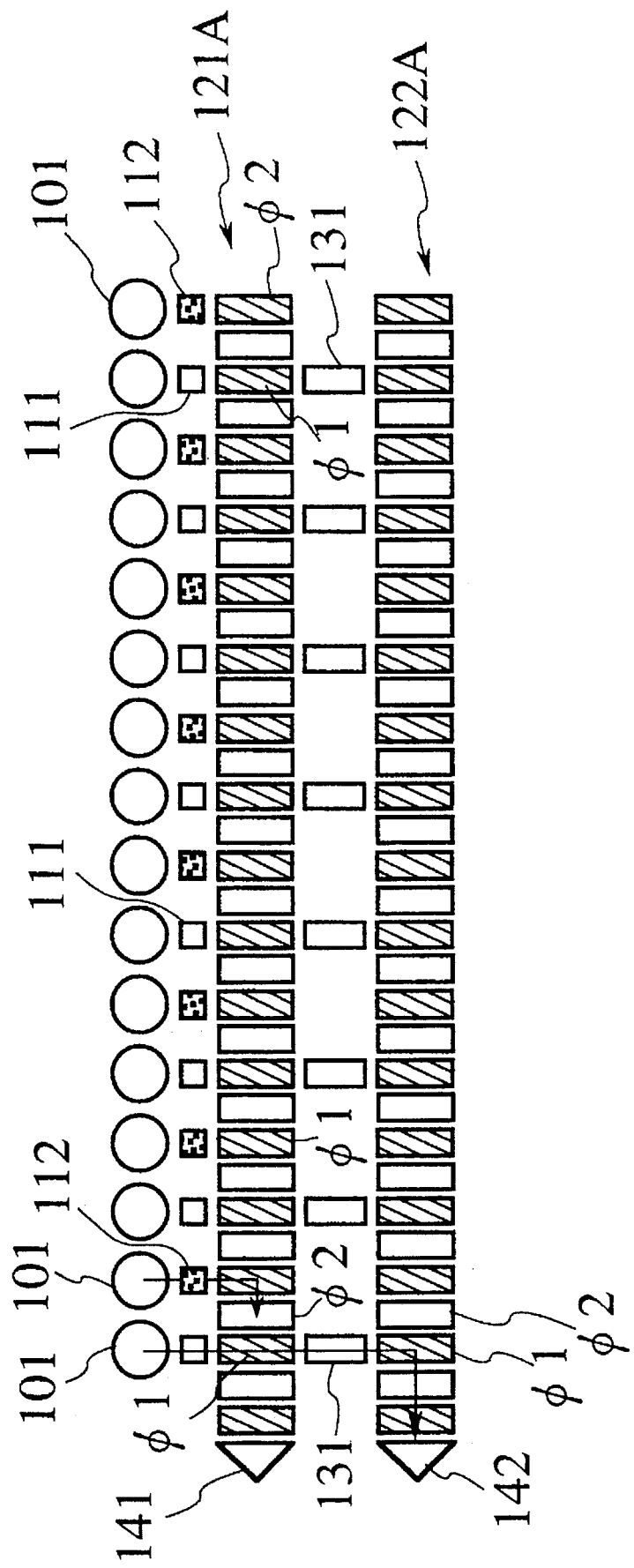
FIG. 10 shows a solid-state image pickup apparatus driven according to a fourth embodiment of the present invention.

FIG. 10 shows a line sensor driven according the fourth embodiment of the present invention.

What is different from the line sensor of FIG. 6 is that the line sensor of FIG. 10 has an inner register 121A and an outer register 122A each having transfer electrodes ø 1 and ø 2. Only the electrodes ø 1 of the inner register 121A are adjacent to shift gates 111 and 112. The shift gates 111 control the Integration time of odd ones of photosensors 101, and shift gates 112 control the integration time of even ones of the photosensors 101.

Figure 11:
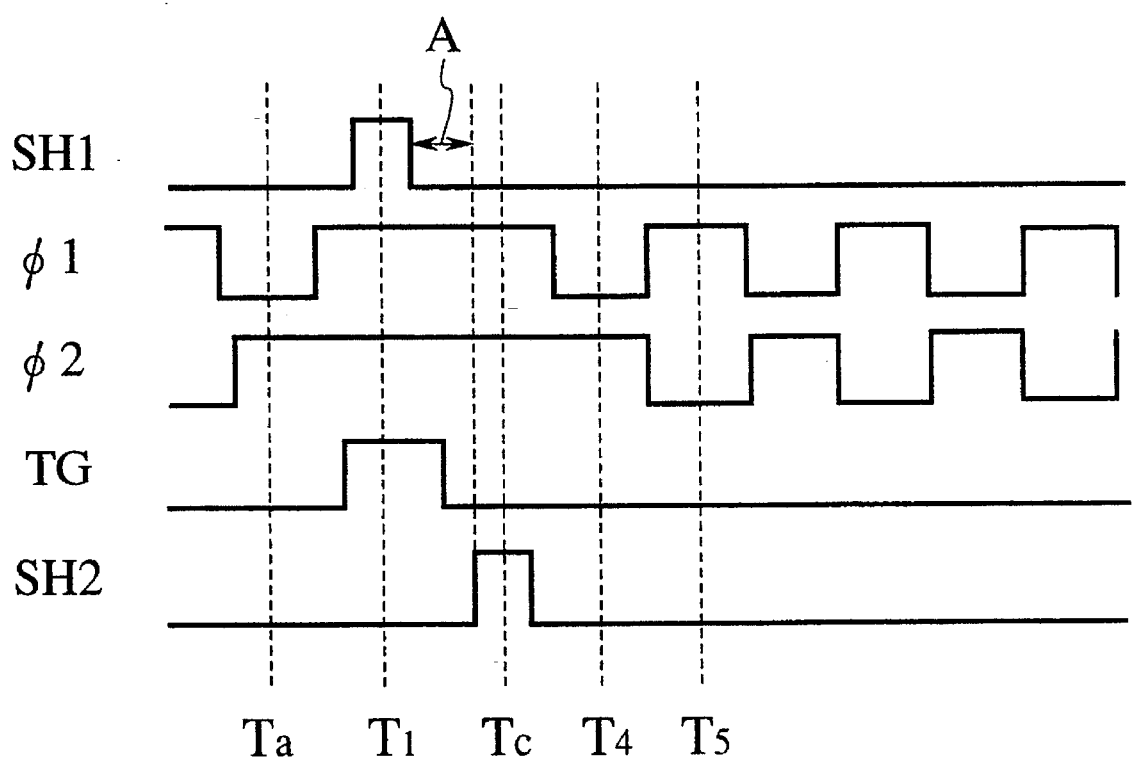
FIG. 11 is a timing chart according to the fourth embodiment.

FIG. 11 is a time chart showing a method of driving the line sensor of FIG. 10.

Unlike the second embodiment that opens the electrode SH2 of each shift gate 112 at time T4, the fourth embodiment opens the electrode SH2 of each shift gate 112 at time Tc before time T4.

The fourth embodiment narrows a period A between the open timing of the electrode SH1 and that of the electrode SH2, to minimize a discrepancy in integration start time between the odd and even photosensors.

The other timing of the fourth embodiment is the same as that of the second embodiment, and therefore, the dark outputs of the fourth embodiment are the same as those of FIG. 7. The fourth embodiment is capable of preventing a shading in the dark outputs without changing the structure of the apparatus.

Figure 12:
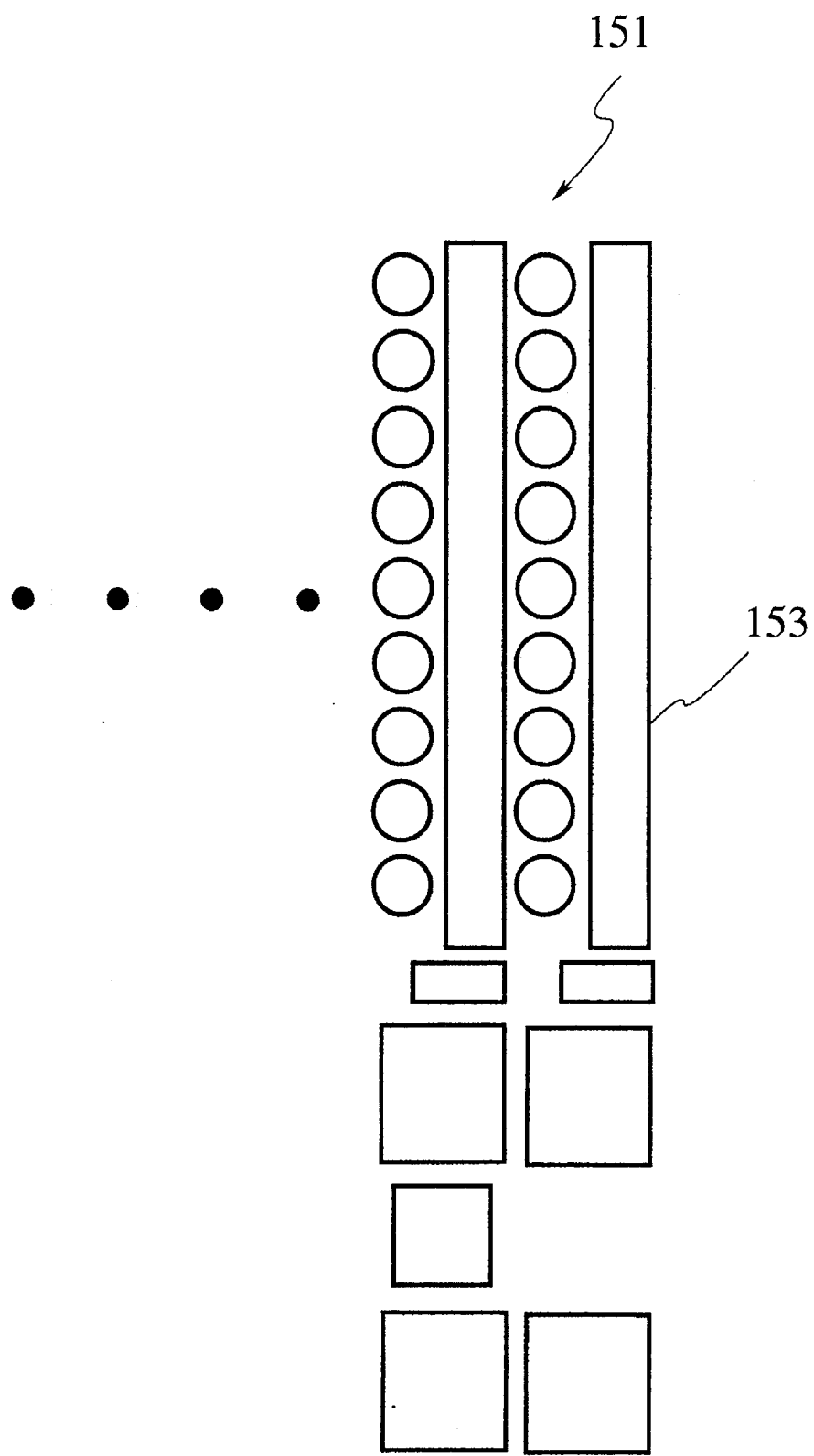
FIG. 12 shows an array sensor according to the present invention.

Although the present invention has been explained with reference to line sensors, the present invention is also applicable to two-dimensional array sensors used for, for example, television cameras. In this case, photosensors are arranged in a two-dimensional matrix, and a vertical transfer register is arranged at each column of the matrix. FIG. 12 shows an example of the two-dimensional array sensor. Each photosensor 101 of FIG. 6 is replaced with a column 151 of vertically arranged photosensors and a vertical transfer register 153 for transferring signal charges generated by the photosensor column 151.

The photosensor matrix forms a distribution of charges corresponding to a two-dimensional image at once. All charges are simultaneously transferred to the vertical transfer registers 153, from which the charges are transferred to horizontal transfer registers 121 and 122 (FIG. 6) column by column. Thereafter, the same processes mentioned above are carried out. Due to the two horizontal transfer registers 121 and 122, a transfer operation carried out with a 20-MHz clock signal will effect a transfer operation with a 40-MHz clock signal. This is proper for image pickup apparatuses of high-vision cameras.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to the particular use contemplated.

What is claimed is:

1. A method of driving a solid-state image pickup apparatus having a line of photosensors for generating signal charges in response to the intensity of incident light, first horizontal transfer registers arranged side by side to face the photosensors with shift gates interposing between them, second horizontal transfer registers corresponding to the first registers, respectively, with transfer gates interposing between them, and output circuits for receiving signal charges horizontally transferred through the first and second registers and providing them outside, comprising the steps of:

providing the first registers with a signal to transfer dark charges from even ones of the first registers to odd ones thereof;

providing even ones of the shift gates with a signal to transfer signal charges from even ones of the photosensors to the even first registers;

providing the transfer gates with a signal to transfer the signal charges transferred to the even first registers to even ones of the second registers;

providing odd ones of the shift gates with a signal to transfer signal charges from odd ones of the photosensors to the odd first registers;

providing the first and second registers with a signal to horizontally transfer the signal charges transferred to the first and second registers; and successively providing the signal charges horizontally transferred through the first and second registers outside from the output circuits.

2. The method as claimed in claim 1, wherein the signal to the even shift gates, to transfer signal charges from the even photosensors to the even first registers is simultaneously provided with the signal to the transfer gates, to transfer the signal charges transferred to the even first registers to the even second registers.

3. The method as claimed In claim 1, wherein, when the transfer gates are provided with the signal to transfer the signal charges transferred to the even first registers to the even second registers, the even and odd first registers are provided with a signal opposite to the signal applied to the transfer gates.

4. The method as claimed in claim 1, wherein the even and odd first registers are provided with opposite-phase signals, respectively, to horizontally transfer the signal charges, and the even and odd second registers with opposite-phase signals, respectively, to horizontally transfer the signal charges.

5. A method of driving a solid-state image pickup apparatus having a line of photosensors for generating signal charges in response to the intensity of incident light, first horizontal transfer registers arranged side by side to face the photosensors with shift gates interposing between them, second horizontal transfer registers corresponding to the first registers, respectively, with transfer gates interposing between them, and output circuits for receiving signal charges horizontally transferred through the first and second registers and providing them outside, comprising the steps of:

provding the first registers with a signal to transfer dark charges from ones of the first registers corresponding to even ones of the photosensors to adjacent ones of the first registers;

providing the shift gates with a signal to transfer signal charges from the even photosensors to the first registers;

providing the transfer gates with a signal to transfer the signal charges transferred from the even photosensors to the first registers to the second registers;

providing the shift gates with a signal to transfer signal charges from odd ones of the photosensors to the first registers;

providing the first and second registers with a signal to horizontally transfer the signal charges transferred to the first and second registers; and successively providing the signal charges horizontally transferred through the first and second registers outside from the output circuits.

6. A method of driving a solid-state image pickup apparatus having an array of photosensors for generating signal charges in response to the intensity of incident light, vertical transfer registers arranged adjacent to the columns of the photosensor array, respectively, first horizontal transfer registers arranged side by side adjacent to one ends of the vertical transfer registers with shift gates interposing between them, second horizontal transfer registers corresponding to the first registers, respectively, with transfer gates interposing between them, and output circuits for receiving signal charges horizontally transferred through the first and second horizontal registers and providing them outside, comprising the steps of:

providing the first horizontal registers with a signal to transfer dark charges from even ones of the first horizontal registers to odd ones thereof;

providing even ones of the shift gates with a signal to transfer signal charges from even ones of the vertical registers to the even first horizontal registers;

providing the transfer gates with a signal to transfer the signal charges transferred to the even first horizontal registers to even ones of the second horizontal registers;

providing odd ones of the shift gates with a signal to transfer signal charges from odd ones of the vertical registers to the odd first horizontal registers;

providing the first and second horizontal registers with a signal to horizontally transfer the signal charges transferred to the first and second horizontal registers; and successively providing the signal charges horizontally transferred through the first and second horizontal registers outside from the output circuits.

\* \* \* \* \*